US011827215B2

(12) United States Patent
Raichelgauz et al.

(10) Patent No.: US 11,827,215 B2
(45) Date of Patent: Nov. 28, 2023

(54) METHOD FOR TRAINING A DRIVING RELATED OBJECT DETECTOR

(71) Applicant: AUTOBRAINS TECHNOLOGIES LTD., Tel-Aviv-Yafo (IL)

(72) Inventors: Igal Raichelgauz, Tel Aviv (IL); Roi Saida, Acco (IL)

(73) Assignee: AUTOBRAINS TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 16/835,318

(22) Filed: Mar. 31, 2020

(65) Prior Publication Data

US 2021/0303876 A1 Sep. 30, 2021

(51) Int. Cl.
| | |
|---|---|
| *B60W 30/09* | (2012.01) |
| *G06N 3/04* | (2023.01) |
| *G06V 20/58* | (2022.01) |
| *G06V 40/10* | (2022.01) |
| *G06F 18/214* | (2023.01) |
| *G06V 10/25* | (2022.01) |
| *G06V 10/764* | (2022.01) |
| *G06V 10/44* | (2022.01) |

(52) U.S. Cl.
CPC ......... *B60W 30/09* (2013.01); *G06F 18/2148* (2023.01); *G06N 3/04* (2013.01); *G06V 10/25* (2022.01); *G06V 10/454* (2022.01); *G06V 10/764* (2022.01); *G06V 20/58* (2022.01); *G06V 40/103* (2022.01); *B60W 2554/4029* (2020.02)

(58) Field of Classification Search
None
See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |
| 4,972,363 A | 11/1990 | Nguyen et al. |
| 5,078,501 A | 1/1992 | Hekker et al. |

(Continued)

FOREIGN PATENT DOCUMENTS

| | | |
|---|---|---|
| EP | 1085464 A3 | 1/2007 |
| WO | 0231764 A2 | 4/2002 |

(Continued)

OTHER PUBLICATIONS

Chen W, Sun Q, Wang J, Dong JJ, Xu C. A novel model based on AdaBoost and deep CNN for vehicle classification. Ieee Access. Oct. 12, 2018;6:60445-55. (Year: 2018).*

(Continued)

*Primary Examiner* — Michelle M Entezari
(74) *Attorney, Agent, or Firm* — Reches Patents

(57) ABSTRACT

A method for driving-related object detection, the method may include receiving an input image by an input of an object detector; and detecting, by an object detector, objects that appear in the input image. The detecting includes searching for (i) a first object having a first size that is within a first size range and belongs to a four wheel vehicle class, (ii) a second object having a second size that is within a second size range and belongs to a subclass out of multiple four wheel vehicle subclasses, (iii) a pedestrian, and (iv) a two wheel vehicle; wherein a maximum of the first size range does not substantially exceed a minimum of the second size range.

29 Claims, 7 Drawing Sheets

(56) References Cited

U.S. PATENT DOCUMENTS

| | | |
|---|---|---|
| 5,214,746 A | 5/1993 | Fogel et al. |
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,275,764 B2 | 9/2012 | Jeon |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| RE44,225 E | 5/2013 | Aviv |
| 8,442,321 B1 | 5/2013 | Chang et al. |
| 8,457,827 B1 | 6/2013 | Ferguson et al. |
| 8,495,489 B1 | 7/2013 | Everingham |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,298,763 B1 | 3/2016 | Zack |
| 9,311,308 B2 | 4/2016 | Sankarasubramaniam et al. |
| 9,323,754 B2 | 4/2016 | Ramanathan et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,862,318 B2 * | 1/2018 | Lessmann ............... G06T 7/246 |
| 9,875,445 B2 | 1/2018 | Amer et al. |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 10,949,982 B1 * | 3/2021 | Wang ..................... G06V 20/54 |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |

(56) References Cited

U.S. PATENT DOCUMENTS

| | | |
|---|---|---|
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0230572 A1 | 11/2004 | Omoigui |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0168941 A1* | 7/2007 | Luo ............... G06V 40/103 717/108 |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk et al. |
| 2008/0159622 A1 | 7/2008 | Agnihotri et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037088 A1 | 2/2009 | Taguchi |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala et al. |
| 2010/0306193 A1 | 12/2010 | Pereira |
| 2010/0312736 A1 | 12/2010 | Kello |

(56) References Cited

U.S. PATENT DOCUMENTS

| | | |
|---|---|---|
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0035373 A1 | 2/2011 | Berg et al. |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0131454 A1 | 5/2012 | Shah |
| 2012/0133497 A1 | 5/2012 | Sasaki |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0230548 A1* | 9/2012 | Calman ............... G06V 20/56  382/104 |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0151522 A1 | 6/2013 | Aggarwal et al. |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0198986 A1 | 7/2014 | Marchesotti |
| 2014/0201330 A1 | 7/2014 | Lopez et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2014/0379477 A1 | 12/2014 | Sheinfeld |
| 2015/0033150 A1 | 1/2015 | Lee |
| 2015/0052089 A1 | 2/2015 | Kozloski et al. |
| 2015/0100562 A1 | 4/2015 | Kohlmeier et al. |
| 2015/0117784 A1 | 4/2015 | Lin et al. |
| 2015/0120627 A1 | 4/2015 | Hunzinger et al. |
| 2015/0127516 A1 | 5/2015 | Studnitzer et al. |
| 2015/0134688 A1 | 5/2015 | Jing |
| 2015/0248586 A1 | 9/2015 | Gaidon et al. |
| 2015/0254344 A1 | 9/2015 | Kulkarni et al. |
| 2015/0286742 A1 | 10/2015 | Zhang et al. |
| 2015/0286872 A1 | 10/2015 | Medioni et al. |
| 2015/0324356 A1 | 11/2015 | Gutierrez et al. |
| 2015/0332588 A1 | 11/2015 | Bulan et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0132194 A1 | 5/2016 | Grue et al. |
| 2016/0210525 A1 | 7/2016 | Yang |
| 2016/0221592 A1 | 8/2016 | Puttagunta et al. |
| 2016/0275766 A1 | 9/2016 | Venetianer et al. |
| 2016/0306798 A1 | 10/2016 | Guo et al. |
| 2016/0342683 A1 | 11/2016 | Kwon |
| 2016/0357188 A1 | 12/2016 | Ansari |
| 2016/0368440 A1* | 12/2016 | Trollope ............... B60R 19/023 |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0108258 A1 | 4/2018 | Dilger |
| 2018/0157903 A1 | 6/2018 | Tu et al. |
| 2018/0157916 A1 | 6/2018 | Doumbouya |
| 2018/0158323 A1 | 6/2018 | Takenaka |
| 2018/0189613 A1 | 7/2018 | Wolf et al. |
| 2018/0204111 A1 | 7/2018 | Zadeh |
| 2018/0373929 A1 | 12/2018 | Ye |
| 2019/0005726 A1 | 1/2019 | Nakano |
| 2019/0011922 A1* | 1/2019 | Feng ..................... G05D 1/0094 |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0096135 A1 | 3/2019 | Mutto et al. |
| 2019/0145765 A1* | 5/2019 | Luo ..................... G06K 9/00791  702/153 |
| 2019/0171912 A1 | 6/2019 | Vallespi-Gonzalez et al. |
| 2019/0188501 A1 | 6/2019 | Ryu |
| 2019/0220011 A1 | 7/2019 | Della Penna |
| 2019/0279046 A1 | 9/2019 | Han et al. |
| 2019/0304102 A1 | 10/2019 | Chen et al. |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |
| 2020/0258254 A1* | 8/2020 | Packwood ................ G06T 7/11 |
| 2020/0364474 A1* | 11/2020 | Raichelgauz ............ G06N 3/04 |
| 2020/0410252 A1* | 12/2020 | Tsoi ..................... G06V 10/762 |
| 2021/0042592 A1* | 2/2021 | Hashimoto ........... G06V 10/764 |
| 2021/0229680 A1* | 7/2021 | Chakravarty .......... G06V 10/82 |

FOREIGN PATENT DOCUMENTS

| | | |
|---|---|---|
| WO | 2003067467 A1 | 8/2003 |
| WO | 2005027457 A1 | 3/2005 |

(56) References Cited

FOREIGN PATENT DOCUMENTS

| WO | 2007049282 A2 | 5/2007 |
|---|---|---|
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Audebert N, Saux BL, Lefèvre S. On the usability of deep networks for object-based image analysis. arXiv preprint arXiv:1609.06845. Sep. 22, 2016. (Year: 2016).*
Satyanarayana GS, Majhi S, Das SK. A vehicle detection technique using binary images for heterogeneous and lane-less traffic. IEEE Transactions on Instrumentation and Measurement. Mar. 10, 2021;70:1-4. (Year: 2021).*
Yao, Zhuo, Heng Wei, Zhixia Li, and Jonathan Corey. "Fuzzy c-means image segmentation approach for axle-based vehicle classification." Transportation Research Record 2595, No. 1 (2016): 68-77. (Year: 2016).*
Urazghildiiev I, Ragnarsson R, Ridderstrom P, Rydberg A, Ojefors E, Wallin K, Enochsson P, Ericson M, Lofqvist G. Vehicle classification based on the radar measurement of height profiles. IEEE Transactions on intelligent transportation systems. Jun. 4, 2007;8(2):245-53. (Year: 2007).*
Refai H, Bitar N, Schettler J, Kalaa OA. The study of vehicle classification equipment with solutions to improve accuracy in Oklahoma. Oklahoma. Dept. of Transportation. Materials and Research Division; Dec. 1, 2014. (Year: 2014).*
Mussa, Renatus, Valerian Kwigizile, and Majura Selekwa. "Probabilistic neural networks application for vehicle classification." Journal of transportation engineering 132.4 (2006): 293-302. (Year: 2006).*
Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation For Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al., "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Ma Et El "Semantics modeling based image retrieval system using neural networks", 2005.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on CONTROL '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U

(56) References Cited

OTHER PUBLICATIONS

Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("HIBRID-SOC: A Multi-Core Soc Architecture for Multimedia Signal Processing" (2003).
Stolberg et al, "HIBRID-SOC: A Mul Ti-Core SOC Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop On Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year: 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

\* cited by examiner

9200

METHOD FOR TRAINING A DRIVING RELATED OBJECT DETECTOR

BACKGROUND

Object detection is required in various systems and applications.

Autonomous vehicles and advanced driver assistance systems (ADAS) may include object detection units that should detect driving related objects such as vehicles and pedestrians.

These object detection units are trained using a supervised machine learning process.

In a supervised machine learning process test images are fed to an object detector that outputs an estimate of the objects that appear in the test images.

An error unit receives the estimate and calculated an error between the estimate and reference information that indicates which objects appeared in the test images.

The error is fed to the object detector in order to adjust the object detector to the actual objects that appeared in the test images.

The error calculation and the adjustment of the object detector may be performed in an iterative manner—for example per test image.

The reference information may be generated manually or by other error prone processes and this may reduce the accuracy of the error calculation.

Furthermore—the object detector may be adjusted to compensate for insignificant differences between objects. This adjustment may deviate the configuration of the object detector from an ideal configuration and may also consume many computational resources.

There is a growing need to provide a method, computer readable medium and a system that may be able to provide highly accurate object detection at a low cost.

SUMMARY

There may be provided a method for driving-related object detection, the method may include receiving an input image by an input of an object detector; and detecting, by an object detector, objects that appear in the input image; wherein the detecting may include searching for (i) a first object having a first size that may be within a first size range and belongs to a four wheel vehicle class, (ii) a second object having a second size that may be within a second size range and belongs to a subclass out of multiple four wheel vehicle subclasses, (iii) a pedestrian, and (iv) a two wheel vehicle; wherein a maximum of the first size range does not substantially exceed a minimum of the second size range.

The object detector may be trained to detect (i) four wheel vehicle having a size within the first size range and belongs to a four wheel vehicle class, and at least two out of (a) a car having a size within the second size range, (b) a truck having a size within the second size range, (c) a bus having a size within the second size range, and (d) a van having a size within the second size range.

The receiving may be preceded by training the object detector to detect (i) four wheel vehicle having a size within the first size range and belongs to a four wheel vehicle class, and at least two out of (a) a car having a size within the second size range, (b) a truck having a size within the second size range, (c) a bus having a size within the second size range, and (d) a van having a size within the second size range.

Each one of the four wheel vehicle class, at least some of the multiple four wheel vehicle subclasses, may have a unique set of anchors.

Each one of the four wheel vehicle class, two wheel vehicle and the pedestrian may have a unique set of anchors.

The object detector may include a shallow neural network that may be followed by a region unit.

The the region unit may include a dedicated section for each one out of the four wheel vehicle class, the two wheel vehicle and the pedestrian.

The the shallow neural network may include five by file convolutional filters.

The first size range and the second size range may not overlap.

The first size range and the second size range partially overlap.

There may be provided a non-transitory computer readable medium for driving-related object detection by an object detector, the non-transitory computer readable medium stores instructions for receiving an input image by an input of the object detector; and detecting, by an object detector, objects that appear in the input image; wherein the detecting may include searching for (i) a first object having a first size that may be within a first size range and belongs to a four wheel vehicle class, (ii) a second object having a second size that may be within a second size range and belongs to a subclass out of multiple four wheel vehicle subclasses, (iii) a pedestrian, and (iv) a two wheel vehicle; wherein a maximum of the first size range does not substantially exceed a minimum of the second size range.

The object detector may be trained to detect (i) four wheel vehicle having a size within the first size range and belongs to a four wheel vehicle class, and at least two out of (a) a car having a size within the second size range, (b) a truck having a size within the second size range, (c) a bus having a size within the second size range, and (d) a van having a size within the second size range.

The non-transitory computer readable medium that stores instructions for training the object detector to detect (i) four wheel vehicle having a size within the first size range and belongs to a four wheel vehicle class, and at least two out of (a) a car having a size within the second size range, (b) a truck having a size within the second size range, (c) a bus having a size within the second size range, and (d) a van having a size within the second size range.

Each one of the four wheel vehicle class, at least some of the multiple four wheel vehicle subclasses, may have a unique set of anchors.

Each one of the four wheel vehicle class, two wheel vehicle and the pedestrian may have a unique set of anchors.

The object detector may include a shallow neural network that may be followed by a region unit.

The non-transitory computer readable medium wherein the region unit may include a dedicated section for each one out of the four wheel vehicle class, the two wheel vehicle and the pedestrian.

The non-transitory computer readable medium wherein the shallow neural network may include five by file convolutional filters.

The first size range and the second size range may not overlap.

The first size range and the second size range partially overlap.

There may be provided an object detector that may include an input, a shallow neural network and a region unit; wherein the region unit follows the shallow neural network; wherein the input may be configured to receive an input image; and wherein the shallow neural network and the region unit may be configured to cooperate and detect objects that appear in the input image; wherein a detecting of the object may include may include searching for (i) a first object having a first size that may be within a first size range and belongs to a four wheel vehicle class, (ii) a second object having a second size that may be within a second size range and belongs to a subclass out of multiple four wheel vehicle subclasses, (iii) a pedestrian, and (iv) a two wheel vehicle; wherein a maximum of the first size range does not substantially exceed a minimum of the second size range.

The object detector may be trained to detect (i) four wheel vehicle having a size within the first size range and belongs to a four wheel vehicle class, and at least two out of (a) a car having a size within the second size range, (b) a truck having a size within the second size range, (c) a bus having a size within the second size range, and (d) a van having a size within the second size range.

The receiving may be preceded by training the object detector to detect (i) four wheel vehicle having a size within the first size range and belongs to a four wheel vehicle class, and at least two out of (a) a car having a size within the second size range, (b) a truck having a size within the second size range, (c) a bus having a size within the second size range, and (d) a van having a size within the second size range.

Each one of the four wheel vehicle class, at least some of the multiple four wheel vehicle subclasses, may have a unique set of anchors.

Each one of the four wheel vehicle class, two wheel vehicle and the pedestrian may have a unique set of anchors.

The region unit may include a dedicated section for each one out of the four wheel vehicle class, the two wheel vehicle and the pedestrian.

The shallow neural network may include five by file convolutional filters.

The first size range and the second size range may not overlap.

The first size range and the second size range partially overlap.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
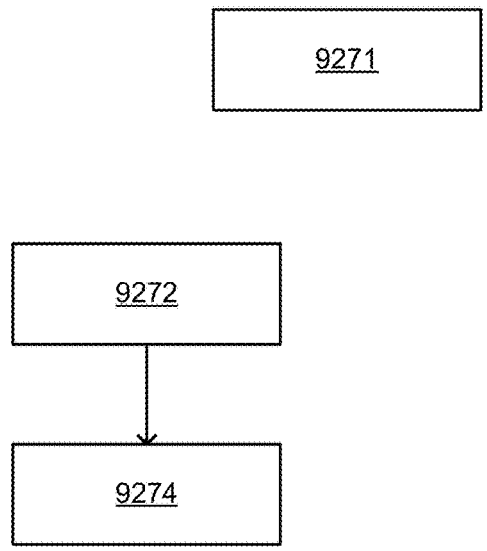
FIG. 1 illustrates an example of a method for object detection.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a low power object detection system (detector), non-transitory computer readable medium, and method. The object detection system, non-transitory computer readable medium and method may prevent errors in learning processes resulting of inaccurate tagging of relatively small four wheel vehicles by classifying (during the training process) objects that are relatively small (appear small in an input image)—within a first size range to a general class of four wheel vehicles.

Larger four wheel vehicle may be classified more accurately to subclasses such as car, bur, truck, van and the like. Other classes (used for at least classifying small objects) include, for example two wheel vehicles and pedestrians.

Each of these other classes may also include subclasses that may be applied to objects that are larger and can be accurately tagged (during the training process) to finer subclasses.

This size based classification increases the accuracy of the reference information received during the training, improves the accuracy of the training process, improves the accuracy of the object detection and also prevents the training process to spend too much resources on attempting to differentiate between insignificant differences. This also provides an object detector that is fine tunes to differentiate between difference that are significant.

After the completion of the training process the object detector it set to detect in an accurate manner the objects according to their size and classes or subclasses.

FIG. 1 illustrates method 9270 for driving-related object detection.

Method 9270 may include the steps of:

Step 9272 of receiving an input image by an input of an object detector.

Step 9274 of detecting, by an object detector, objects that appear in the input image.

Step 9272 may include searching for (i) a first object having a first size that is within a first size range and belongs to a four wheel vehicle class, (ii) a second object having a second size that is within a second size range and belongs to a subclass out of multiple four wheel vehicle subclasses, (iii) a pedestrian, and (iv) a two wheel vehicle; wherein a maximum of the first size range does not substantially exceed a minimum of the second size range.

The object detector may be trained to perform said search (and method 9270 may include the training—step 9271) by feeding the object detector with images of objects that are tagged according to the searched objects (i) till (iv). The object detector may be also trained to reject objects that are too big and. The training includes feeding the object detector with images that include objects of at least one of the four types (i)-(iv), generating reference information that tags the objects according the the searched types, calculating an error between the outcome of the object detector and the reference information and feeding the error to the object detector.

The subclasses of the four wheel vehicle class may include at least some of the following car, truck, bus, van and the like. The subclasses may include or may be further partitioned to certain type of vehicle, model, and the like.

Accordingly—the classification system may include two layers (single class and single layer of subclasses) or even more layer—to provide a hierarchical classification system that may include more than two layers. For example—a first layer includes a four wheel vehicle, the second layer (subclasses) include car, bus, truck, van and the third layer may include a manufacturer, yet a fourth layer may include model, and the like.

The class of pedestrians and/or the class of two wheel vehicles can also include subclasses to include two or more layers.

Each one of the four wheel vehicle class, at least some of the multiple four wheel vehicle subclasses, may have has a unique set of anchors. The unique sets of anchors may be selected based on the expected shape of the objects that belong to the class and/or the subclass.

Each one of the four wheel vehicle class, two wheel vehicle and the pedestrian has a unique set of anchors.

Anchors may be regarded as initial templates of bounding boxes and using different anchors to different classes may reduce the computational resources, speed the detection and increase the accuracy of the bounding boxes when the different anchors are selected according to the expected shapes of the different vehicles. For example, in a side view, a bus appears longer and higher than a private car. Yet for another example a pedestrian may require bounding boxes that have a height that exceeds their width—while trucks (for example in side view) may require bounding boxes that have a height that is smaller than their width.

Figure 2:
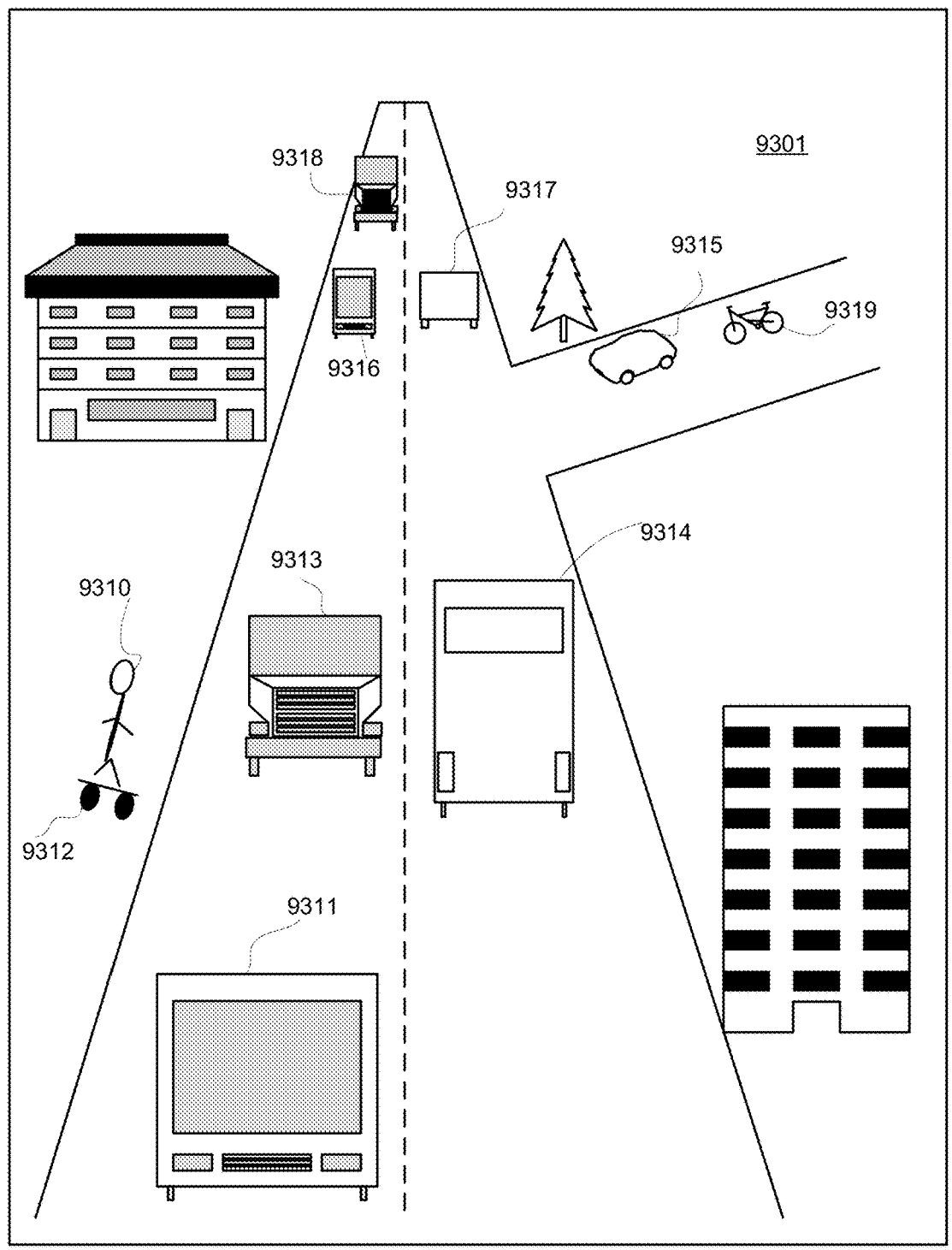
FIG. 2 illustrates an example of an image.

FIG. 2 is an example of an image 9301 that includes first bus 9311, second bus 9314, third bus 9316, first truck 9313, second truck 9317, third truck 9318, first car 9315, first bicycle 9319, and first foot scooter 9312.

Figure 3:
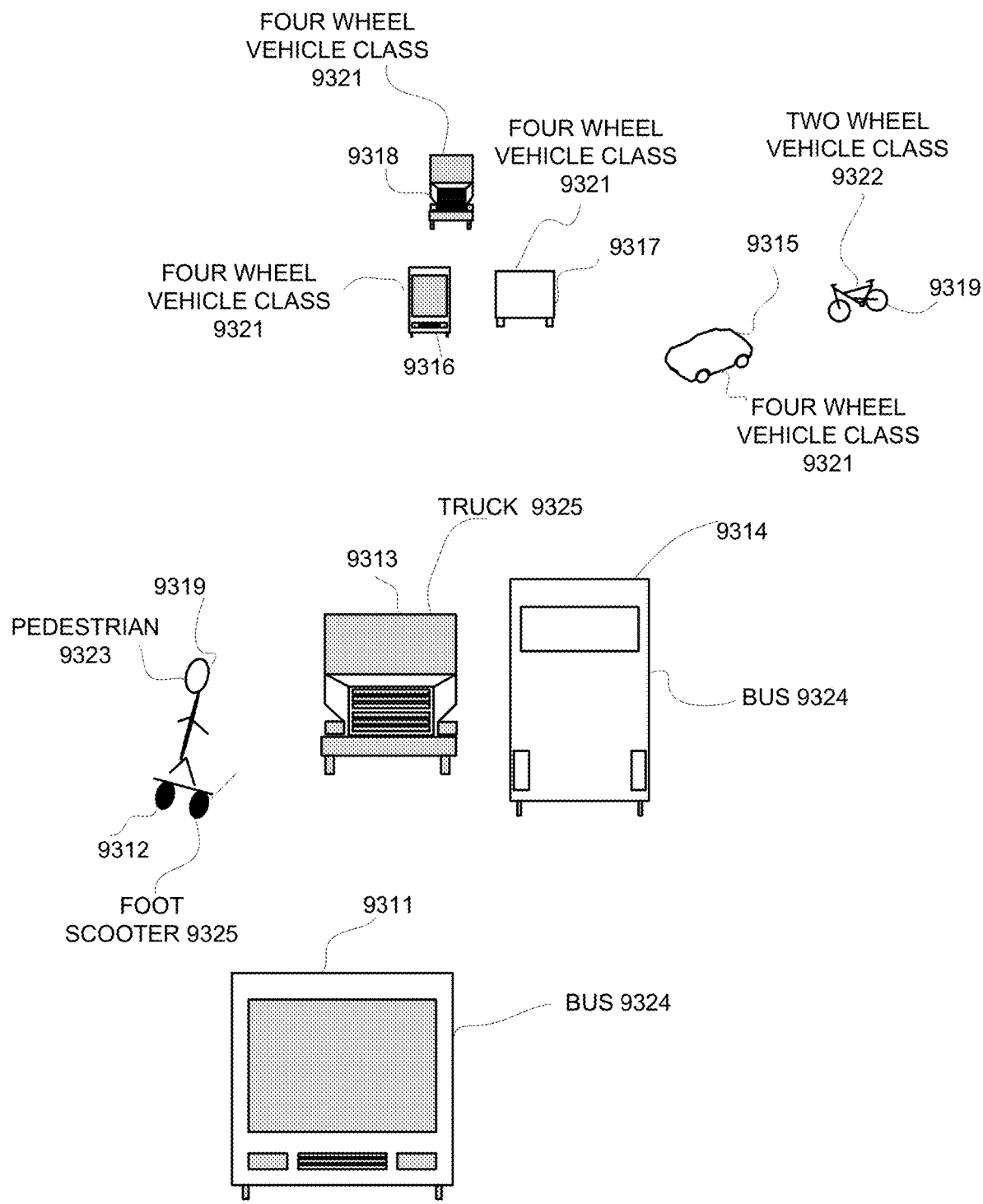
FIG. 3 illustrates an example of a classification of some of the objects that appear in the image.

FIG. 3 illustrates the tagging of the objects of image 9301. The tagging may be included in a reference information used to train the object detector or may be the outcome of the object detection process.

Third bus 9316, second truck 9317, third truck 9318, first car 9315 and first bicycle 9319 are too small (for example have a size within a first size range) and therefore are tagged to classes and not to subclasses.

Third bus 9316, second truck 9317, third truck 9318, first car 9315 are regarded as belonging to a four wheel vehicles class 9321.

The first bicycle 9319 is tagged to belonging to a two wheel vehicle class 9322.

First bus 9311 is large enough (has a size within a second size range) to be tagged as a truck 9325. First bus 9311 and second bus 9314 are large enough (has a size within a second size range) to be tagged as a bus. First foot scooter 9312 is large enough (has a size within a second size range) to be tagged as a foot scooter 9325.

Figure 4:
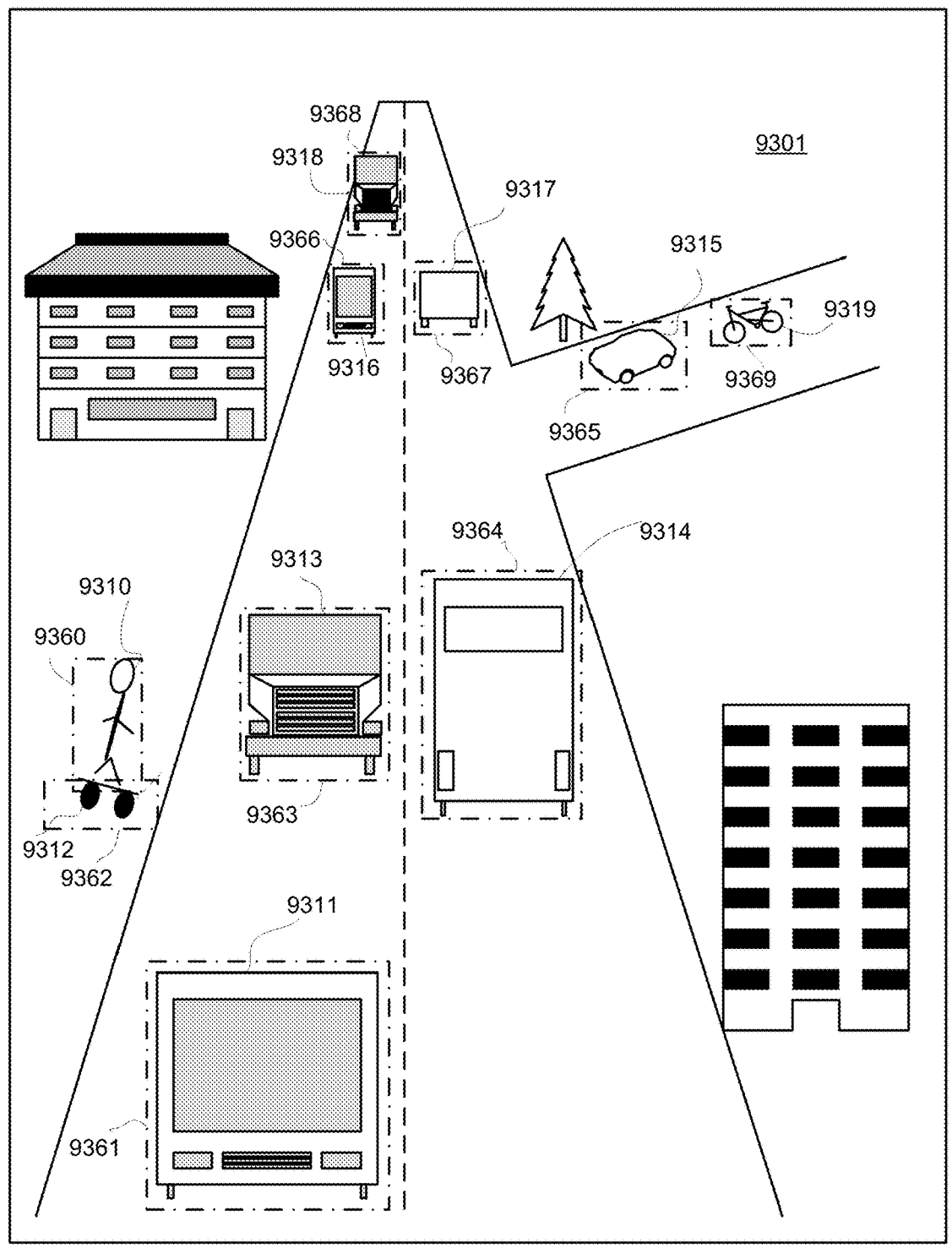
FIG. 4 illustrates an example of the image of FIG. 1 with bounding boxes that surround some of the objects that appear in the image.

FIG. 4 illustrates an example of a possible output of the object detector—bounding boxes 9310, 9311, 9312, 9313, 9314, 9315, 9316, 9317, 9318 and 9319 that surround pedestrian 9310, first bus 9311, foot scooter 9312, first truck 9313, second bus 9314, first car 9315, third bus 9316, second truck 9317, third truck 9318, first bicycle 9319, respectively.

Each bounding is represented by information 9025 that may include coordinates (x,y,h,w) of the bounding boxes, objectiveness and class. The coordinate indicate the location (x,y) as well as the height and width of the bounding boxes. Objectiveness provides a confidence level that an object exists. Class—class of object—as illustrated above). The (x,y) coordinates may represent the center of the bounding box.

The object detection may be compliant to any flavor of YOLO—but other object detection schemes may be applied.

Figure 5:
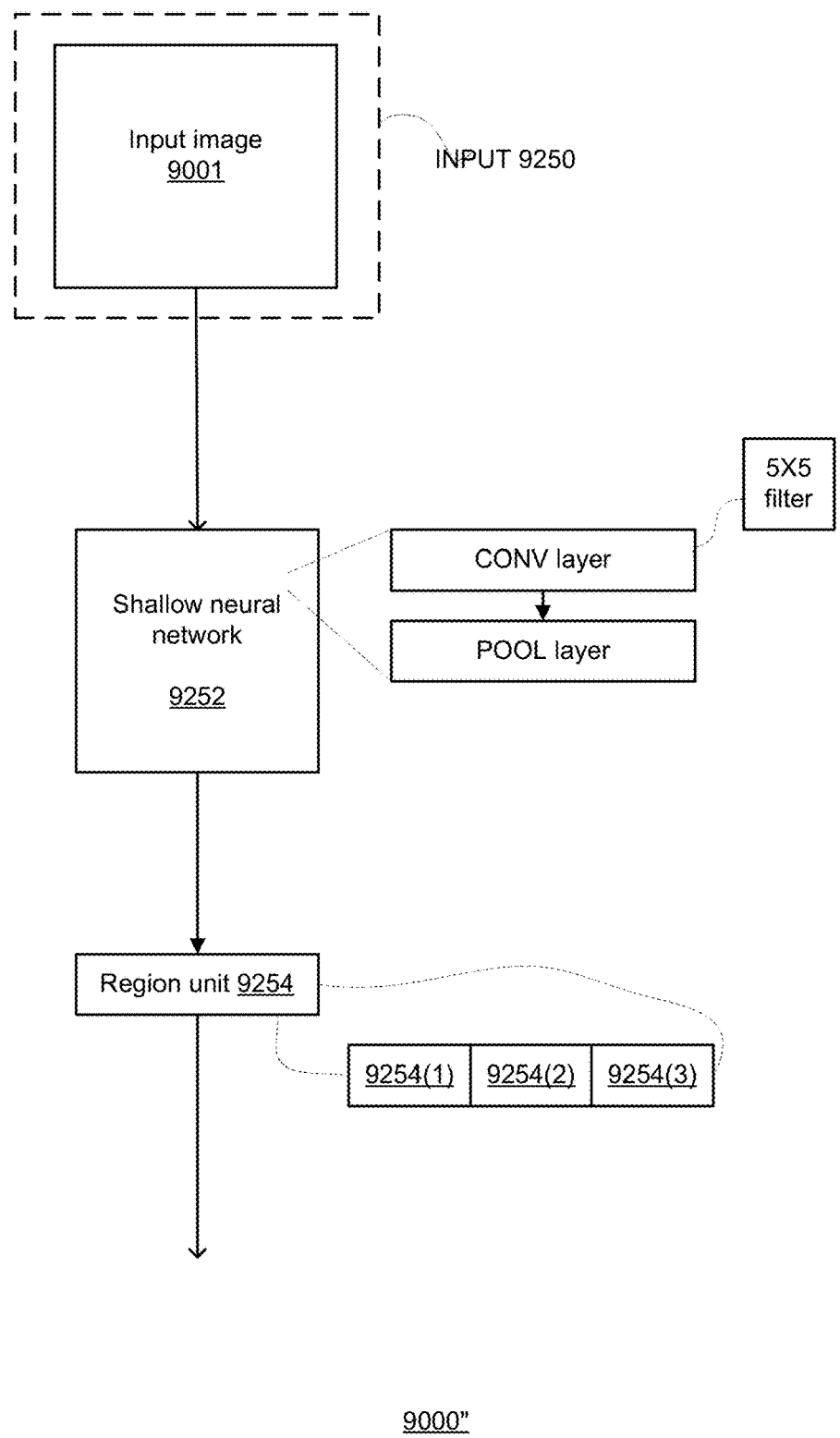
FIG. 5 illustrates an example of an object detector.
Figure 6:
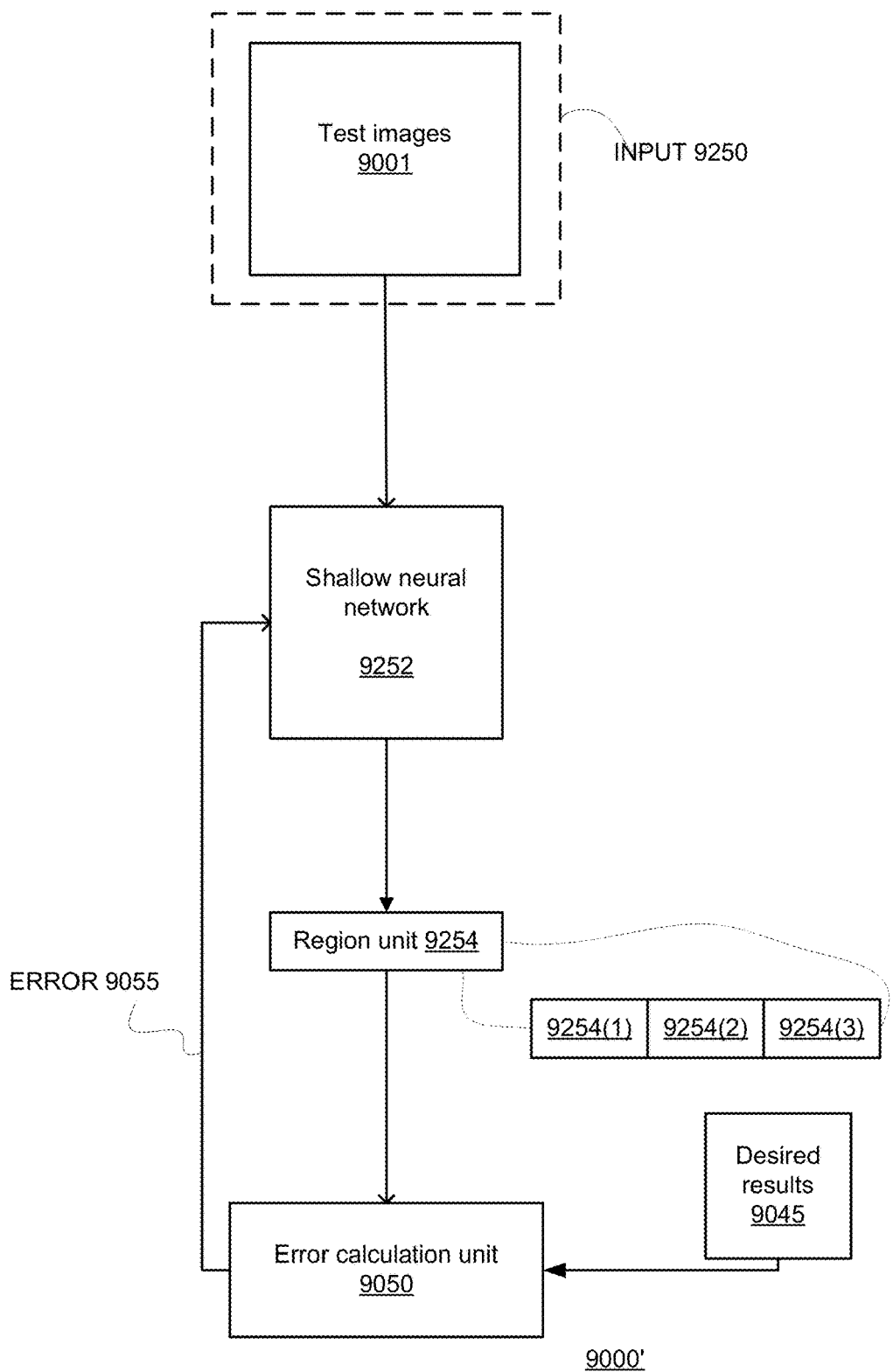
FIG. 6 illustrates an example of various objects.
Figure 7:
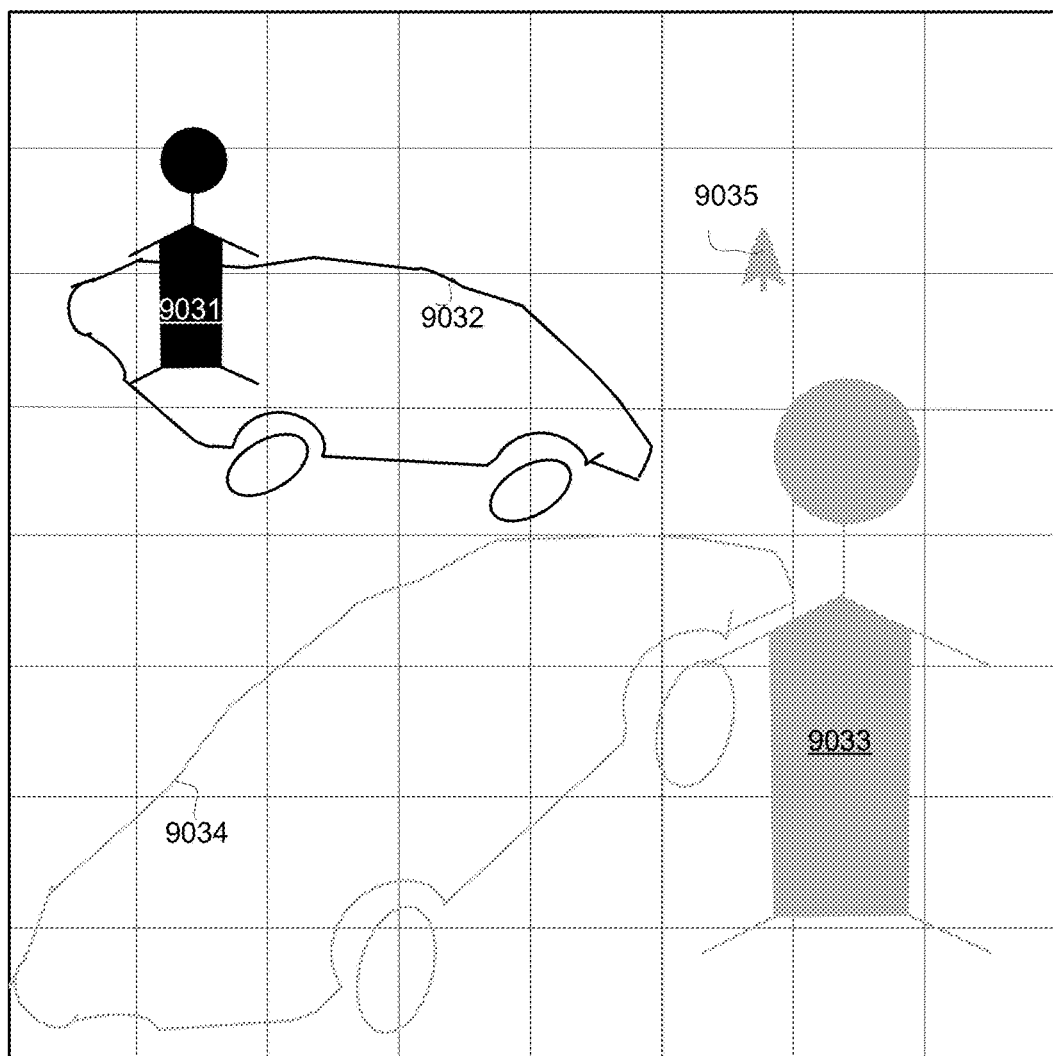
FIG. 7 illustrates an example of a training process.

FIG. 5 illustrates an object detector 9000" and FIG. 7 illustrates a training process of the object detector.

Object detector 9000" may include an input 9250, a shallow neural network 9252 and a region unit 9254.

The region unit 9254 follows the shallow neural network 9252.

Input 9250 may be configured to receive an input image 9001.

The shallow neural network 9252 and the region unit 9254 may be configured to cooperate (both participate in the object detection process—the region unit processed the output of the shallow neural network) and detect objects that appear in the input image.

The detecting of the object may include may include searching for (i) a first object having a first size that may be within a first size range and belongs to a four wheel vehicle class, (ii) a second object having a second size that may be within a second size range and belongs to a subclass out of multiple four wheel vehicle subclasses, (iii) a pedestrian, and (iv) a two wheel vehicle; wherein a maximum of the first size range does not substantially exceed a minimum of the second size range.

The shallow neural network 9252 may include convolutional and spooling layers.

The convolutional layers may include convolutional filters. The convolutional filters may be of any shape and size—for example be five by five convolutional filters (have a kernel of five by five elements), be a three by three convolutional filters (have a kernel of three by three elements), and the like.

Object detector 9000″ may be configured to execute method 9270.

The region unit may include a dedicated section for each one out of the four wheel vehicle class, the two wheel vehicle and the pedestrian. This will improve the detection per each class of objects.

At least a part of the object detector may be a processing circuitry that may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

At least a part of the object detector may be application implemented in hardware, firmware, or software that may be executed by a processing circuitry.

Regarding the training process:

Test images 9001 are fed to shallow neural network 9252 that outputs, for each test image, a shallow neural network output that may be a tensor with multiple features per segment of the test image. The region unit 9054 is configured to receive the output from shallow neural network 9252 and calculate and output candidate bounding boxes per test image. Actual results such as the output candidate bounding boxes per test image may be fed to error calculation unit 9050.

Error calculation unit 9050 also receives desired results 9045—objects that are tagged to belong to (i) a four wheel vehicle class (if the size with within the first size range), or to (ii) a subclass out of multiple four wheel vehicle subclasses ((if the size with within the first size range), (iii) a pedestrian, and (iv) a two wheel vehicle.

Error calculation unit 9050 calculates an error 9055 between the the actual results and the desired results- and the error is fed to the shallow neural network 9252 during the training process.

It should be noted that in addition to the mentioned above training—the shallow neural network 9252 may be trained to reject (not detect) objects that are too big—for example outside the first and second size ranges.

This may require to train the shallow neural network 9252 not to detect said objects.

FIG. 7 illustrates various objects such as 9031, 9032, 9033 and 9034.

Objects 9033 and 9034 are too big and should be ignored of.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for driving-related object detection, the method comprises:
   receiving an input image by an input of an object detector; and
   detecting, by the object detector, objects that appear in the input image;
   wherein the detecting comprises searching for (i) a first object that appears in the image at a first size that is within a first size range and belongs to a four wheel vehicle class, (ii) a second object that appears in the image at a second size that is within a second size range and belongs to a subclass out of multiple four wheel vehicle subclasses, (iii) a pedestrian, and (iv) a two wheel vehicle; wherein a maximum of the first size range is smaller than a minimum of the second size range;
   wherein the searching for the first object comprises preventing from classifying a four wheel vehicle to any of the multiple four wheel vehicle subclasses when the four wheel vehicle appears in the image at a size that is within the first size range.

2. The method according to claim 1 wherein the object detector is trained to detect (i) four wheel vehicle that appears in the image at a size within the first size range and belongs to a four wheel vehicle class, and at least two out of (a) a car that appears in the image at a size within the second size range, (b) a truck that appears in the image at a size within the second size range, (c) a bus that appears in the image at a size within the second size range, and (d) a van that appears in the image at a size within the second size range.

3. The method according to claim 1 wherein the receiving is preceded by training the object detector to detect (i) four wheel vehicle that appears in the image at a size within the first size range and belongs to a four wheel vehicle class, and at least two out of (a) a car that appears in the image at a size within the second size range, (b) a truck that appears in the image at a size within the second size range, (c) a bus that appears in the image at a size within the second size range, and (d) a van that appears in the image at a size within the second size range.

4. The method according to claim 1 wherein each one of the four wheel vehicle class, at least some of the multiple four wheel vehicle subclasses, has a unique set of anchors.

5. The method according to claim 1 wherein the detecting comprises ignoring objects that appear in the image at a size that exceeds a maximal value of the second size range.

6. The method according to claim 1 wherein the object detector comprises a shallow neural network that is followed by a region unit.

7. The method according to claim 6 wherein the region unit comprises a dedicated section for each one out of the four wheel vehicle class, the two wheel vehicle and the pedestrian.

8. The method according to claim 6 wherein the shallow neural network comprises five by five convolutional filters.

9. The method according to claim 1 wherein each one of the four wheel vehicle class, two wheel vehicle and the pedestrian has a unique set of anchors, the anchors are initial templates of bounding boxes.

10. The method according to claim 9 wherein different anchors are selected according to expected shapes of the vehicles.

11. A non-transitory computer readable medium for driving-related object detection by an object detector, the non-transitory computer readable medium stores instructions for:
    receiving an input image by an input of the object detector; and
    detecting, by the object detector, objects that appear in the input image;
    wherein the detecting comprises searching for (i) a first object that appears in the image at a first size that is within a first size range and belongs to a four wheel vehicle class, (ii) a second object that appears in the image at a second size that is within a second size range and belongs to a subclass out of multiple four wheel vehicle subclasses, (iii) a pedestrian, and (iv) a two wheel vehicle; wherein a maximum of the first size range is smaller than a minimum of the second size range;
    wherein the searching for the first object comprises preventing from classifying a four wheel vehicle to any of the multiple four wheel vehicle subclasses when the four wheel vehicle appears in the image at a size that is within the first size range.

12. The non-transitory computer readable medium according to claim 11 wherein the object detector is trained to detect (i) four wheel vehicle that appears in the image at a size within the first size range and belongs to a four wheel vehicle class, and at least two out of (a) a car that appears in the image at a size within the second size range, (b) a truck that appears in the image at a size within the second size range, (c) a bus that appears in the image at a size within the second size range, and (d) a van that appears in the image at a size within the second size range.

13. The non-transitory computer readable medium according to claim 11 that stores instructions for training the object detector to detect (i) four wheel vehicle that appears in the image at a size within the first size range and belongs to a four wheel vehicle class, and at least two out of (a) a car that appears in the image at a size within the second size range, (b) a truck that appears in the image at a size within the second size range, (c) a bus that appears in the image at a size within the second size range, and (d) a van that appears in the image at a size within the second size range.

14. The non-transitory computer readable medium according to claim 11 wherein each one of the four wheel vehicle class, at least some of the multiple four wheel vehicle subclasses, has a unique set of anchors.

15. The non-transitory computer readable medium according to claim 11 wherein the detecting comprises ignoring objects that appear in the image at a size that exceeds a maximal value of the second size range.

16. The non-transitory computer readable medium according to claim 11 wherein the object detector comprises a shallow neural network that is followed by a region unit.

17. The non-transitory computer readable medium according to claim 16 wherein the region unit comprises a dedicated section for each one out of the four wheel vehicle class, the two wheel vehicle and the pedestrian.

18. The non-transitory computer readable medium according to claim 16 wherein the shallow neural network comprises five by five convolutional filters.

19. The non-transitory computer readable medium according to claim 11 wherein each one of the four wheel vehicle class, two wheel vehicle and the pedestrian has a unique set of anchors, the anchors are initial templates of bounding boxes.

20. The non-transitory computer readable medium according to claim 19 wherein different anchors are selected according to expected shapes of the vehicles.

21. An object detector that comprises an input, a shallow neural network and a region unit; wherein the region unit follows the shallow neural network; wherein the input is configured to receive an input image; and wherein the shallow neural network and the region unit are configured to cooperate and detect objects that appear in the input image; wherein a detecting of the object comprises searching for (i) a first object that appears in the image at a first size that is within a first size range and belongs to a four wheel vehicle class, (ii) a second object that appears in the image at a second size that is within a second size range and belongs to a subclass out of multiple four wheel vehicle subclasses, (iii) a pedestrian, and (iv) a two wheel vehicle; wherein a maximum of the first size range is smaller than a minimum of the second size range; wherein the searching for the first object comprises preventing from classifying a four wheel vehicle to any of the multiple four wheel vehicle subclasses when the four wheel vehicle appears in the image at a size that is within the first size range.

22. The object detector according to claim 21 wherein the object detector is trained to detect (i) four wheel vehicle that appears in the image at a size within the first size range and belongs to a four wheel vehicle class, and at least two out of (a) a car that appears in the image at a size within the second size range, (b) a truck that appears in the image at a size within the second size range, (c) a bus that appears in the image at a size within the second size range, and (d) a van that appears in the image at a size within the second size range.

23. The object detector according to claim 21 wherein the receiving is preceded by training the object detector to detect (i) four wheel vehicle that appears in the image at a size within the first size range and belongs to a four wheel vehicle class, and at least two out of (a) a car that appears in the image at a size within the second size range, (b) a truck that appears in the image at a size within the second size range, (c) a bus that appears in the image at a size within the second size range, and (d) a van that appears in the image at a size within the second size range.

24. The object detector according to claim 21 wherein each one of the four wheel vehicle class, at least some of the multiple four wheel vehicle subclasses, has a unique set of anchors.

25. The object detector according to claim 21 wherein the detecting comprises ignoring objects that appear in the image at a size that exceeds a maximal value of the second size range.

26. The object detector according to claim 21 wherein the region unit comprises a dedicated section for each one out of the four wheel vehicle class, the two wheel vehicle and the pedestrian.

27. The object detector according to claim 21 wherein the shallow neural network comprises five by five convolutional filters.

28. The object detector according to claim 21 wherein each one of the four wheel vehicle class, two wheel vehicle and the pedestrian has a unique set of anchors, the anchors are initial templates of bounding boxes.

29. The object detector according to claim 21 wherein different anchors are selected according to expected shapes of the vehicles.

* * * * *